US006221148B1

(12) United States Patent
Mathur et al.

(10) Patent No.: US 6,221,148 B1
(45) Date of Patent: Apr. 24, 2001

(54) MANUFACTURE OF IMPROVED METAKAOLIN BY GRINDING AND USE IN CEMENT-BASED COMPOSITES AND ALKALI-ACTIVATED SYSTEMS

(75) Inventors: Sharad Mathur, Macon, GA (US); Karen Ann Gruber, Hamilton, NJ (US); Harry J. Reid, Macon, GA (US)

(73) Assignee: Engelhard Corporation, Iselin, NJ (US)

( * ) Notice: Subject to any disclaimer, the term of this patent is extended or adjusted under 35 U.S.C. 154(b) by 0 days.

(21) Appl. No.: 09/449,650

(22) Filed: Nov. 30, 1999

(51) Int. Cl.⁷ .................................................. C04B 14/10
(52) U.S. Cl. ......................... 106/484; 106/486; 106/416; 106/718; 106/694; 241/16; 241/22; 241/21
(58) Field of Search ..................... 106/484, 486, 106/487, 416, 718, 694; 241/16, 22, 24.23, 21

(56) References Cited

U.S. PATENT DOCUMENTS

| 3,754,712 | * | 8/1973 | Cecil ..................... 106/484 |
| 4,349,158 |   | 9/1982 | Broman ................... 241/21 |
| 4,509,985 |   | 4/1985 | Davidovits et al. ..... 106/84 |
| 4,593,860 |   | 6/1986 | Cook et al. ............. 241/23 |
| 4,640,715 |   | 2/1987 | Heitzmann et al. ..... 106/85 |
| 4,693,427 |   | 9/1987 | Bilimoria et al. ....... 241/23 |
| 4,747,548 |   | 5/1988 | Kikkawa et al. ........ 241/21 |
| 4,842,649 |   | 6/1989 | Heitzmann et al. ..... 106/89 |
| 4,975,396 |   | 12/1990 | Thiery ................... 501/90 |
| 4,994,114 |   | 2/1991 | Thiery et al. ........... 106/713 |
| 5,030,286 |   | 7/1991 | Crawford et al. ....... 106/435 |
| 5,074,475 |   | 12/1991 | Suitch et al. ........... 241/17 |
| 5,167,710 |   | 12/1992 | Leroux et al. .......... 106/711 |
| 5,261,956 |   | 11/1993 | Dunaway et al. ....... 106/416 |
| 5,332,433 |   | 7/1994 | Story et al. ............. 106/442 |
| 5,342,595 |   | 8/1994 | Davidovits et al. ..... 423/328.1 |
| 5,352,427 |   | 10/1994 | Davidovits et al. ..... 423/328.1 |
| 5,372,640 |   | 12/1994 | Schwarz et al. ........ 106/705 |
| 5,393,340 | * | 2/1995 | Slepetys et al. ........ 106/416 |
| 5,624,489 |   | 4/1997 | Fu et al. ................. 106/692 |
| 5,626,665 |   | 5/1997 | Barger et al. ........... 106/706 |
| 5,735,946 | * | 4/1998 | Bloodworth et al. ... 106/484 |
| 5,775,601 |   | 7/1998 | Avant, Jr. et al. ...... 241/4 |
| 5,785,749 | * | 7/1998 | Knesek et al. .......... 106/484 |
| 5,792,251 |   | 8/1998 | Smiley et al. .......... 106/484 |
| 6,027,561 | * | 2/2000 | Gruber et al. ........... 106/718 |

OTHER PUBLICATIONS

Wiley I, et al "Davidovits Geopolymers," Journal of Thermal Analysis, vol. 37 (1991), 1633–1656 (No month).

* cited by examiner

Primary Examiner—Michael Marcheschi
(74) Attorney, Agent, or Firm—Raymond F. Keller

(57) ABSTRACT

In one embodiment, the present invention relates to a method of making a highly reactive pozzolan, involving the steps of forming a slurry comprising metakaolin and a liquid; wet milling the slurry; and separating the metakaolin from the liquid to provide the highly reactive pozzolan. In another embodiment, the present invention relates to a method of making a cement-based composition involving the steps of providing a highly reactive pozzolan by forming a slurry comprising metakaolin and a liquid, wet milling the slurry, and separating the metakaolin from the liquid; and combining the highly reactive pozzolan with at least one cementitious material.

23 Claims, No Drawings ical # US 6,221,148 B1

MANUFACTURE OF IMPROVED METAKAOLIN BY GRINDING AND USE IN CEMENT-BASED COMPOSITES AND ALKALI-ACTIVATED SYSTEMS

FIELD OF THE INVENTION

This invention relates to novel methods of making a metakaolin material well suited for cement-based composites and alkali-activated systems.

BACKGROUND OF THE INVENTION

The use of metakaolin in cement is known. For example, U.S. Pat. No. 4,793,861 describes a cement-based product which is reinforced with glass fibers having good resistance to alkaline environments. The product contains, for each 100 parts by weight of cement, about 10 to 40 parts by weight of metakaolin, the latter exhibiting a reactivity to the modified Chapelle test greater than 500 mg of CaO per gram of metakaolin.

U.S. Pat. No. 4,842,649 describes a blended hydraulic cement composition composed of portland cement, slag, pozzolans including metakaolin, and admixtures including potassium carbonate and water reducing compositions.

U.S. Pat. No. 4,975,396 describes a process for producing reinforced cementitious compositions in which the following constituents are mixed in the aqueous phase in the following order: about 35–55 parts by weight of water mixed with about 3–12 parts of a polymer, by weight of dry polymer; up to about 5 parts of a water-reducing auxiliary agent and/or a liquefying agent; from about 15–30 parts of metakaolin; from about 50–120 parts of silica sand; and about 100 parts of cement. Continuous mixing is maintained until a homogeneous, thixotropic paste is obtained. Then between 2 and 15% by weight of alkaline-resistant glass fibers, relative to the weight of the paste, is introduced into the paste.

U.S. Pat. No. 4,994,114 describes method for selecting a pozzolan (for example metakaolin) for incorporation into a composite material comprising cement and glass.

U.S. Pat. No. 5,167,710 describes a process for making a cement mixture containing fibers wherein a paste is formed by mixing cement and, per 100 parts by weight of cement, approximately 5 to 20 parts by weight of a first pulverized material of which the grains have an average diameter of between 1/5 and 1/10 of the average diameter of the grains of the cement and approximately 20 to 35 parts by weight of water. The paste is then mixed with reinforcing fibers. The paste may also include a second pulverized material the average grain diameter of which is between 1/5 and 1/10 of the average diameter of the first pulverized material.

U.S. Pat. No. 5,372,640 describes cement-based products reinforced with alkali-resistant glass fibers that become almost insensitive to aging when 30 to 40 parts by weight of a metakaolin composition are added for each 100 parts of cement.

U.S. Pat. NO. 5,624,489 describes a conversion-preventing additive for high-alumina cement-based compositions, the additive comprising: siliceous pozzolanic powder, e.g. zeolite, granulated blast-furnace slag, fly ash, silica fume, rice hulls, metakaolin; inorganic salts containing sodium or potassium cations and sulphate, carbonate, nitrate, silicate, phosphate, chloride or bromide anions, and optionally other chemical admixtures, e.g. superplasticizers.

U.S. Pat. No. 5,626,665 describes cementitious systems comprised of gypsum, calcined clay, and clinker.

Pozzolans are finely divided materials which can react with alkali to form cementitious products. The fine particle size and large pore volume of pozzolans, however, can lead to an increase in water demand. In cement-based systems, the addition of extra water can reduce the performance of the system by reducing the strength and increasing the permeability of the resultant cement-based structures. The diminished strength is undesirable for several reasons. Initially, delay in early strength development results in surface cracking due to evaporation. Secondly, jobs take longer because the concrete form must remain in place substantially longer, and finishing is delayed.

Reactive pozzolans can be made by dry grinding metakaolin using ball milling. However, ball milling is an expensive and time consuming process. In this connection, ball milling often requires 6 hours of milling time. Such long processing times restricts the commercial manufacturability of dry milled pozzolans. Dry milling is not therefore frequently employed on the raw metakaolin. However, the addition of metakaolin to finishing mills or mills for clinker or slag grinding (dry milling) is employed for incorporating pozzolans into cement-based systems.

Nevertheless, there is still a need for pozzolans having improved activity to provide cement-based systems and alkali activated systems having lower water demand and higher compressive strength, as well as improved flowability as a dry powder and a higher bulk density to reduce shipping and storage costs.

SUMMARY OF THE INVENTION

This invention relates to cement-based compositions containing a highly reactive pozzolan based upon a wet milled metakaolin. The cement-based compositions have lower water demand and equivalent or improved flowability in dry form compared to conventional cement-based compositions. Resultant structures or composites made from the cement-based compositions according to the present invention have high compressive strength compared to structures made from cement-based compositions made with conventional pozzolans (dry milled metakaolin and unprocessed metakaolin).

In one embodiment, the present invention relates to a method of making a highly reactive pozzolan, involving the steps of forming a slurry comprising metakaolin and a liquid; wet milling the slurry; and separating the metakaolin from the liquid to provide the highly reactive pozzolan.

In another embodiment, the present invention relates to a method of making a cement-based composition involving the steps of providing a highly reactive pozzolan by forming a slurry comprising metakaolin and a liquid, wet milling the slurry, and separating the metakaolin from the liquid; and combining the highly reactive pozzolan with at least one cementitious material.

In yet another embodiment, the present invention relates to a method of making an alkali-activated composition involving the steps of providing a highly reactive pozzolan by forming a slurry comprising metakaolin and a liquid, wet milling the slurry for a period of time from about 2 minutes to about 30 minutes, and separating the metakaolin from the liquid; and combining the highly reactive pozzolan with at least one geopolymeric material.

In still yet another embodiment, the present invention relates to a method of making a highly reactive pozzolan composition involving the steps of forming a slurry comprising from about 20% to about 80% by weight of metakaolin and from about 20% to about 80% by weight of a liquid and wet milling the slurry for a period of time from about 1 minute to about 60 minutes to provide the highly reactive pozzolan composition.

DETAILED DESCRIPTION OF THE INVENTION

The cement-based compositions of this invention are intended for use in cement-based applications such as swimming pool plasters, grouts, mortars and concrete. The alkali-activated compositions of this invention are intended for use in geopolymer and zeolitic applications such as the formation of cast and molded bodies, the storage of toxic chemicals and radioactive waste, and in specialty concretes. The cement-based composites or compositions of the present invention contain at least one cementitious material, at least one highly reactive pozzolan, and optionally at least one dispersant. The cement-based composition is the total combined dry mixture of the cementitious composition and highly reactive pozzolan materials which react with water to form the binder in concrete or other material. Concrete is a construction material comprised of the cement-based composition, water, optional admixtures, and aggregates.

Cementitious materials include those materials typically required to make cement; that is, those materials that can react with lime or other alkali and exhibit cementing properties. Generally speaking, cementitious materials are binder materials that harden to form a connecting medium between solids. Cementitious materials include cements, which are any mixture of finely-ground lime, alumina, and silica that will set to a hard product that combines with other ingredients to form a hydrate such as portland cement, hydraulic cements, blended cement, and masonry cement, mortar, and related aggregate, admixtures and/or additives including hydrated lime, limestone, chalk, calcareous shell, talc, slag or clay.

Ordinary portland cement is a hydraulic cement produced by pulverizing portland cement clinker. Portland cements are classified under ASTM standards ©150–95 into eight types, including: Type I for use in general concrete construction where the special properties specified for Types II, III, IV and V are not required; Type II for use in general concrete construction exposed to moderate sulphate action, or where moderate heat of hydration is required; Type III for use when high early strength is required; Type IV for use when low heat of hydration is required; Type V for use when high sulphate resistance is required; and Types IA, IIA and IIIA, which are the same as Types I, II, and III, respectively, except that they have an air entraining agent added. "Ordinary portland cement" in the context of this invention includes all types (I–V and IA–IIIA) of portland cement as referenced in ASTM C 150–95, including any cement blends thereof.

In one embodiment, the cement-based compositions of the present invention contain from about 50% to about 99.5% by weight of a cementitious material. In another embodiment, the cement-based compositions of the present invention contain from about 75% to about 99% by weight of a cementitious material.

The alkali-activated systems of the present invention contain at least one geopolymeric material, at least one highly reactive pozzolan, and optionally at least one dispersant. Many geopolymeric materials are described in U.S. Pat. Nos. 4,509,985; 5,342,595; and 5,352,427, which are incorporated by reference for their teachings in this regard. Geopolymeric materials include one or more of aluminosilicate oxide, strong alkalis such as sodium hydroxide and potassium hydroxide, water, sodium and potassium silicates, $M_2O$ compounds such as one or more of $Na_2O$, $K_2O$, zeolites, silica, alumina and other metal oxides. Generaly, alkali-activated compositions are formed by reacting specific ratios of silica and alumina with various alkali compounds. In the present invention, the amount of alkali that is placed in an aqueous slurry containing metakaolin while remaining fluid is primarily dependent upon the absorption/adsorption characteristics of the metakaolin.

In one embodiment, the alkali-activated systems of the present invention contain from about 40% to about 99.5% by weight of one or more geopolymeric materials. In another embodiment, the alkali-activated systems of the present invention contain from about 70% to about 99% by weight of one or more geopolymeric materials.

The cement-based compositions and the alkali-activated systems contain at least one highly reactive pozzolan. The cement-based compositions and the alkali-activated systems according to the present invention have at least one of lower water demand, higher compressive strength, and higher flowability in the fluid state compared with cement-based compositions and alkali-activated systems that do not contain a highly reactive pozzolan according to the present invention.

In one embodiment, the cement-based compositions of the present invention contain from about 0.5% to about 50% by weight of a highly reactive pozzolan. In another embodiment, the cement-based compositions of the present invention contain from about 1% to about 25% by weight of a highly reactive pozzolan. In yet another embodiment, the cement-based compositions of the present invention contain from about 2% to about 20% by weight of a highly reactive pozzolan.

In one embodiment, the alkali-activated systems of the present invention contain from about 0.5% to about 50% by weight of a highly reactive pozzolan. In another embodiment, the alkali-activated systems of the present invention contain from about 1% to about 25% by weight of a highly reactive pozzolan. In yet another embodiment, the alkali-activated systems of the present invention contain from about 2% to about 20% by weight of a highly reactive pozzolan.

The highly reactive pozzolan is highly reactive in that the highly reactive pozzolan has an increased dissolution of silicon and aluminum and a decreased absorption of water and potassium silicate in comparison to conventional metakaolin.

The highly reactive pozzolan is highly reactive further in that composites having at least one of high compressive strengths and low water demand are obtainable as a result of the present invention. That is, the components of the cement-based compositions and the alkali-activated systems of the present invention containing the highly reactive pozzolan react and set in such a manner that composites having high compressive strengths are obtained compared with cement-based compositions and the alkali-activated systems that do not contain the highly reactive pozzolan as described herein. Although the highly reactive pozzolan possesses little or no cementitious value, in the presence of moisture it chemically reacts with a hydroxide, such as calcium hydroxide, at ordinary temperatures to form compounds possessing cementitious properties.

The highly reactive pozzolan is in the form of particles and/or agglomerated beads of microparticles of metakaolin treated in the manner described below. The highly reactive pozzolan may be pulverized or non-pulverized. In one embodiment, the particles and/or agglomerated beads have a median particle size from about 10 microns to about 100 microns (above about 10 microns). In another embodiment, the particles and/or agglomerated beads have a median particle size from about 15 microns to about 75 microns (above about 15 microns). In yet another embodiment, the particles and/or agglomerated beads have an average particle size from about 20 microns to about 50 microns (above about 20 microns).

In a preferred embodiment, the particle size distribution of the particles and/or agglomerated beads is about 95% by weight of the microparticles are from about 10 microns to about 75 microns. In another preferred embodiment, the particle size distribution of the particles and/or agglomerated beads is about 95% by weight of the agglomerated beads are from about 15 microns to about 50 microns.

There are a number of methods and devices for measuring particle sizes in this range. For the purposes of this invention particle size is determined by conventional sedimentation techniques using Micromeretics, Inc.'s SEDIGRAPH® 5100 particle size analyzer. Particles are slurried in water with a dispersant and pumped through the detector with agitation to disperse loose agglomerates.

In one embodiment, the highly reactive pozzolans suitable for use in the present invention may be prepared by a process which comprises forming a liquid slurry comprising at least one metakaolin, and wet grinding the metakaolin liquid slurry. Such a slurry may be stored, and subsequently used to form a cement-based composition or an alkali-activated composition just prior to its intended use. In another embodiment, the highly reactive pozzolans suitable for use in the present invention may be prepared by a process which comprises forming a liquid slurry comprising at least one metakaolin, wet grinding the metakaolin liquid slurry, drying the wet milled metakaolin liquid slurry, and optionally pulverizing the dried wet milled metakaolin. In a preferred embodiment, the metakaolin combined with a liquid to form a slurry has a particle size from about 0.1 micron to about 5 microns. The desired particle size distributions of the metakaolin can be obtained by grinding or pulverizing larger particles of metakaolin and/or through screening, centrifuging, air classification, or other separating means for removing undesirably sized particles, such as those larger than about 10 microns.

Metakaolin is known to those of ordinary skill in the art and can be prepared by calcining hydrous kaolin, which is generally represented by the formula $Al_2O_3 \cdot 2SiO_2 \cdot 2H_2O$, where the water is present as interstitial water. The metakaolin of this invention is typically made by calcination at temperatures from about 350° C. to about 1000° C., more typically from about 500° to about 900° C. The terms "metakaolin" and "metakaolinite" are used herein to mean an activated product of kaolinite, produced thermally or by any other means. The abbreviated formula for metakaolin can be written by using the standard symbols A and S ($A=Al_2O_3$ and $S=SiO_2$) as $AS_2$. In a preferred embodiment, the hydrous kaolin is not milled before it is heat treated to form metakaolin.

A suitable amount of metakaolin is combined with a liquid to form a slurry. The liquid is typically water but may also include organic liquids and especially water-organic liquid mixtures. Optionally, an effective amount of at least one dispersant is included in the slurry to facilitate the dispersion of the metakaolin in the liquid. These dispersants may be preformed and added to the slurry or formed within the slurry. In one embodiment, the cement-based compositions and/or the alkali-activated systems also contain at least one dispersant.

The slurry is typically neutral, e.g., having a pH from about 6 to about 8, and preferably from about 6.5 to about 7.5. The pH of the slurry may be adjusted, if necessary, by the addition of an acid or base so that the final pH of the slurry is approximately neutral. Formation of the slurry is typically conducted at ambient temperature and at atmospheric pressure. Higher or lower temperatures and pressures may be used but are not necessary.

In one embodiment, the slurry contains from about 10% to about 90% by weight of metakaolin and from about 10% to about 90% by weight of liquid. In another embodiment, the slurry contains from about 20% to about 80% by weight of metakaolin and from about 20% to about 80% by weight of liquid. In yet another embodiment, the slurry contains from about 30% to about 70% by weight of metakaolin and from about 30% to about 70% by weight of liquid.

Dispersants suitable for use in the present invention include organic dispersants and inorganic dispersants. Dispersants generally include ammonia-based dispersants and phosphate-based dispersants. Dispersants further include sulfonate dispersants, carboxylic acid dispersants and polymeric dispersants, such as polyacrylate dispersants.

In one embodiment, from about 0.1% to about 20% by weight of the metakaolin of one or more dispersants is added to the slurry. In another embodiment, from about 0.5% to about 10% by weight of the metakaolin of one or more dispersants is added to the slurry. In yet another embodiment, from about 1% to about 8% by weight of the metakaolin of one or more dispersants is added to the slurry.

Inorganic phosphate-based dispersants include diammonium phosphate, dipotassium phosphate, disodium phosphate, monoammonium phosphate, monopotassium phosphate, monosodium phosphate, potassium tripolyphosphate, sodium acid pyrophosphate, sodium hexametaphosphate, sodium tripolyphosphate, tetrapotassium pyrophosphate, tetrasodium pyrophosphate, tripotassium phosphate, trisodium phosphate, urea phosphate and mixtures thereof.

Sulfonate dispersants include naphthalene sulfonates, alkylnaphthalene sulfonates, ethoxylated alkylphenol sulfonates, petroleum sulfonates, fatty acid sulfonates, lignosulfonates, olefin sulfonates, amine sulfonates, and alkylaryl sulfonates. Specific examples include those under the trade designation Morwet® available from Witco Corp., those under the trade designation Sellogen available from Henkel Corp., and those under the trade designation Emkapon available from Emkay Chemical Co.

Carboxylic acids typically include organic acids and their corresponding salts containing from about 6 to about 25 carbon atoms. In another embodiment, carboxylic acids include organic acids and their corresponding salts that contain from about 8 to about 20 carbon atoms.

Polyacrylates include polyacrylic acid, salts of acrylic copolymers, acrylic acid copolymers (for example with maleic acid), and ammonium or alkali metal polyacrylates and polycarboxylate salts. Specific examples include those under the trade designations Acumer® and Acusol available from Rohm & Haas Co., those under the trade designation Colloid available from Rhone-Poulenc Corp., and those under the trade designation Mayosperse available from Mayo Chemical.

In one embodiment, the cement-based compositions, the alkali-activated systems and/or the highly reactive pozzolan also contain at least one of water reducers and superplasticizers. A minor amount of a flocculating agent may also be incorporated into the mixture to facilitate dispersion/suspension of the particles in the liquid medium. In addition, materials other than metakaolin may be incorporated into the mixture. For example, a minor amount of special water-soluble or water-dispersible sorbents (e.g., silicas, aluminas or other clays) to selectively adsorb sulfur, soaps, phosphorous or other deleterious compounds may be incorporated into the mixture and end up in the agglomerated beads. Additional additive materials include gypsum, alkali salts, hydrated kiln dust, hydrated lime, fly ash, plasticizing agents, etc.

In one embodiment, the cement-based compositions, the alkali-activated systems and/or the highly reactive pozzolans contain a binder such as carboxymethyl cellulose, polyvinyl alcohol and/or polyvinylpyrrolidone. In another embodiment, the cement-based compositions, the alkali-activated systems and/or the highly reactive pozzolans do not contain a binder such as carboxymethyl cellulose, polyvinyl alcohol and/or polyvinylpyrrolidone. In a preferred embodiment, the highly reactive pozzolan composition does not contain a binder such as carboxymethyl cellulose, polyvinyl alcohol and/or polyvinylpyrrolidone.

In another embodiment, the cement-based compositions, the alkali-activated systems and/or the highly reactive pozzolans contain a minor amount of at least one binder material, preferably a water dispersible binder. As used herein, a "water dispersible binder" shall mean that under typical process conditions, the binder is soluble in water or other liquid medium or is sufficiently dispersed or suspended therein. Binders suitable for use within the context of the present invention include alginates, dextrin, glucose, gums, starch, waxes, glues; polymeric compounds such as poly (vinylacetate); mineral acids such as sulfuric acid and phosphoric acid; phosphates such as ammonium phosphate; silica compounds such as alkaline silicates and silica hydrosol; and colloidal clays such as aftapulgite. These binder materials are typically present in an amount up to about 10% by weight of the highly reactive pozzolan on a moisture-free basis, preferably from about 1% to about 5% by weight. Typically, the polymer compound, if present as the only binder, is present in an amount up to about 3% by weight of the highly reactive pozzolan on a moisture-free basis; and the colloidal clay, if present as the only binder, is present in an amount up to about 5% by weight of the highly reactive pozzolan on a moisture-free basis (as used herein in this context means the weight achieved after heating to a constant weight at about 250° F.).

The metakaolin slurry is then wet milled. Wet milling procedures are known. Typically wet milling employs a drum mill, vertical media mills, a sedimentary delaminator, or colloid/dispersion mill. Wet milling may involve one or more of high intensty milling, moderate intensity mill and low intensity milling. Specific examples of wet mills include a Chaser mill, Cowles mill, a Colloid mill, a Duncan mill, a Kady mill, a Morehouse mill, a Muller mill, a Netzsch mill, a Premier mill, a Kotthoff mill and various sedimentary delaminators.

In one embodiment, the metakaolin slurry is wet milled for a period of time from about 1 minute to about 60 minutes (less than about 1 hour). In another embodiment, the metakaolin slurry is wet milled for a period of time from about 2 minutes to about 30 minutes (less than about 30 minutes). In yet another embodiment, the metakaolin slurry is wet milled for a period of time from about 2.5 minutes to about 15 minutes (less than about 15 minutes). In still yet another embodiment, the metakaolin slurry is wet milled for a period of time from about 3 minutes to about 10 minutes (less than about 10 minutes).

In one embodiment, the metakaolin slurry is wet milled at a temperature from about −10° C. to about 150°C. In this embodiment, an aqueous slurry contains an additive that either lowers the freezing point or raises the boiling point of water. In another embodiment, the metakaolin slurry is wet milled at a temperature from about 10° C. to about 80° C. In yet another embodiment, the metakaolin slurry is wet milled at a temperature from about 15° C. to about 70° C.

Wet milling decreases the pore volume of the particles and/or agglomerated beads of metakaolin. Comparing the metakaolin used to form the slurry, and the highly reactive pozzolan made in accordance with the present invention (metakaolin after required processing), in one embodiment, there is from about 5% to about 75% reduction in pore volume. In another embodiment, there is from about 10% to about 60% reduction in pore volume. In yet another embodiment, there is from about 20% to about 50% reduction in pore volume.

The wet milled metakaolin slurry is dried in any suitable manner. For example, drying may be conducted by spray drying the slurry, flash drying the slurry, rotary drying, apron drying the slurry, oven drying the slurry, mixing the slurry or other drying techniques. The time required for drying varies, and primarily depends upon the amount and identity of the liquid in the slurry. Flash drying techniques are known in the clay industry. Spray drying techniques are known in the clay industry. As a reference, consult, e.g., "Atomization and Spray Drying," by W. R. Marshall (Chemical Engineering Monograph Series, No. 2, Vol. 50 (1954)), which is hereby incorporated by reference for its teachings in this regard.

In spray drying, the mixture of metakaolin, liquid (preferably water) and optional additives or ingredients is adjusted, if necessary, by the addition of liquid so that the metakaolin slurry is pumpable and sprayable. In one embodiment, the concentration of metakaolin in the slurry is at least 40% by weight of the slurry. In another embodiment, the concentration of metakaolin in the slurry is at least 50% by weight of the slurry. In yet another embodiment, the concentration of metakaolin in the slurry is at least 60% by weight of the slurry. It is noted that due to rheological considerations, smaller interactive particles tend to make a viscous mix, so transport properties depend on the size of the particles as well as their concentration. The mixture or slurry is then sprayed into an atmosphere of hot, inert gases (to this product).

Spray dryers of various designs can be used. These dryers may be of the concurrent, countercurrent, or mixed flow type. Nozzles, disks or the like can be used to disperse the slurry into droplets. The temperature of the inlet and outlet air of the spray dryer will depend, of course, on the design of the dryer. The actual internal temperature of the agglomerated beads in the drying chamber should be below 225° F., for example from about 180° F. to 200° F. At these temperatures, there is very little or no change in the crystal structure of the clay (free water is eliminated but interstitial water is not eliminated). The droplets thus become porous agglomerated beads of metakaolin and are collected downstream of the drying chamber, by the usual methods. Using a concurrent dryer, the air inlet temperature and the clay slurry feed rate are adjusted to produce an air outlet temperature within the range from about 250° F. to about 300° F.

In another embodiment, the wet milled metakaolin (mixture of metakaolin, liquid and optional ingredients) can be agglomerated in a mechanical mixer prior to drying. Mixing typically involves using a high-shear mixer. A preferred type of mixer employs pins or blades mounted radially on a rotating shaft, so that the tip of the pin or blade, traveling at high speed, causes solid particles, binder and water to impinge upon or contact each other in such a way as to form an agglomerate. In time, nominally-spherical particles tend to grow larger and larger. This phenomenon is enhanced by the tips of the blades or pins coming very close to a stationary wall or to a solid object (e.g., another blade or pin) moving at a different relative rate. The vortexes set up by this shearing motion tend to enhance the sphericity of the growing beads.

Other less energy-intensive mechanical contacting processes are known to those skilled in the art, including the use of drum or dish granulators, fluidized or spouted bed granulators, or tumbling, rotary, vibratory or gyratory granulators. For descriptions of these processes, see, for example, Sherrington, P. J., *Granulation,* Heyden & Son, Ltd., (1981), which is incorporated herein by reference for its teaching in this regard. These and similar devices can be used to produce granules, although not all are optimum for making the instant invention.

Optionally after drying the wet milled metakaolin, the metakaolin product is pulverized in any suitable manner. Pulverization methods and apparatuses are known to those skilled in the art. For example, pulverization may be conducted using a high energy impact mill.

The highly reactive pozzolan contains from about 70% to about 100% by weight of processed metakaolin (wet milled, dried, and optionally pulverized) and from about 0% to about 30% of one or more dispersants and additives. In another embodiment, the highly reactive pozzolan contains from about 80% to about 99.5% by weight of metakaolin microparticles and from about 0.5% to about 20% of one or more dispersants and additives. In yet another embodiment, the highly reactive pozzolan contains from about 90% to about 99% by weight of metakaolin microparticles and from about 1% to about 10% of one or more dispersants and additives.

In one embodiment, the highly reactive pozzolan is combined with one or more cementitious materials to form a cement-based composition. Cement paste is made by adding water to the cement-based composition. Swimming pool plaster, grouts, concrete and mortar are made by combining water, the cement-based composition, and any desired aggregate, admixtures or additives. In another embodiment, the highly reactive pozzolan is combined with one or more geopolymeric materials including alkali containing products to form an alkali-activated system or composition for cast and molded bodies, the storage of toxic chemicals and radioactive waste, and in specialty concretes.

ASTM C 109/109M-95 quantifies the compressive strength of hydraulic cement mortars. The number following the ASTM test method number indicates that it is the ASTM test method in effect during that specific year, such as 1995 in the case where 95 follows the ASTM test method. The compressive strength is the measured maximum resistance of a specimen to axial compressive loading normally expressed as force per unit cross-sectional area. Although the ASTM test methods are set out specifically, those skilled in the art may be aware of alternative methods which could be used to test for the referenced qualities or results. The only difference being, the results or qualities may be reported in a different manner wherein a conversion system could be used to give comparable results. Consequently, the invention should not be limited by the referenced test methods and the results thereof, but rather only to the claims as set forth below taking into account equivalent testing methods and results.

Examples of this invention are included hereinbelow. Of course, the examples are not intended as limiting this invention as modification of the examples by ordinary expedient will be readily apparent to those of ordinary skill in the art. Unless otherwise indicated in the following examples and elsewhere in the specification and claims, all parts and percentages are by weight, temperatures are in degrees Celsius, pressures are at or near atmospheric.

Several mortar compositions, both according to the present invention and not according to the invention are made and compared. In the compositions, a cement-based composition of 80% by weight mortar cement and 20% by weight of a metakaolin (the metakaolin is varied as specified below) is combined with water with a water-to-cement ratio of 0.4. Sand is added as aggregate in an amount so that the sand:cementitious weight ratio is 2.75 (cementitious in these examples refers to mortar cement and metakaolin). Comparative Example 1 is made with metakaolin (untreated). Comparative Example 2 is made with dry milled metakaolin (ball milled for 6 hours). Comparative Example 3 is made with metakaolin that is slurried and spray dried. Example 1 is made with metakaolin that is wet milled (in a Netzsch mill for 5 minutes), spray dried, and pulverized. Example 2 is made with metakaolin that is wet milled (in a Netzsch mill for 5 minutes) and spray dried. Example 3 is made with metakaolin that is wet milled (in a sedimentary delaminator for 15 minutes), oven dried, and pulverized.

The extent of dissolution of aluminum and silicon ions in compositions made with pozzolans manufactured according to the present invention and not according to the invention is examined. Generally, the higher dissolution of aluminum and silicon ions, the faster the composition reacts. Dissolution is measured by quantifying the amount of leaching in a 30% KOH solution. The results are reported in Table 1.

TABLE 1

| Example | 5 minute leach | | 15 minute leach | |
| --- | --- | --- | --- | --- |
| | Al, ppm | Si, ppm | Al, ppm | Si, ppm |
| C. Ex. 1 | 50 | 60 | — | — |
| C. Ex. 2 | 418 | 318 | 462 | 379 |
| C. Ex. 3 | 69 | 69 | 90 | 90 |
| Ex. 1 | 272 | 245 | 364 | 348 |
| Ex. 2 | 180 | 162 | 258 | 246 |
| Ex. 3 | 136 | 122 | 170 | 158 |

The extent of potassium silicate absorption in compositions made with pozzolans made according to the present invention and not according to the invention is examined next. Generally, the lower the potassium silicate absorption, the lower the water demand of the composition (and thus a higher resultant compressive strength). Potassium silicate absorption is measured by quantifying the amount of potassium silicate absorbed in a 30% KOH solution. The results are reported in Table 2. Although Comparative Example 2 has a low potassium silicate absorption, it involves dry milling metakaolin for 6 hours while Examples 1, 2, and 3 involve wet milling metakaolin for 5 minutes, 5 minutes, and 15 minutes, respectively, which is an enormous time savings in the manufacturing process.

TABLE 2

| Example | potassium silicate absorption |
|---|---|
| C. Ex. 1 | 0.9 |
| C. Ex. 2 | 0.6 |
| C. Ex. 3 | 0.83 |
| Ex. 1 | 0.62 |
| Ex. 2 | 0.63 |
| Ex. 3 | 0.58 |

The flowability of compositions made with pozzolans made according to the present invention and not according to the invention is examined in accordance with ASTM 230. Generally, the higher the flow, the lower water demand of the composites made in accordance with the present invention. Flowability of the fresh mortar can also be used as a measure of the workability of a given mixture. The results are reported in Table 3.

TABLE 3

| Example | Flow |
|---|---|
| C. Ex. 1 | 47 mm |
| Ex. 3 | 56 mm |

The compressive strength over time is examined. Each mortar composition is formed into a 2 inch cube and the compressive strength is tested. The reported compressive strengths represent the average of testing two cubes (for each composition at each testing age). When not under testing, the mortar cubes are stored in lime water. The results are reported in Table 4.

TABLE 4

| Testing Age | Compressive Strength (psi) | |
|---|---|---|
| (days) | Ex. 3 | C. Ex. 1 |
| 1 | 3,665 | 3,810 |
| 3 | 6,840 | 6,500 |
| 7 | 8,845 | 8,385 |
| 28 | 9,710 | 9,455 |

Two additional mortar compositions, one according to the present invention and one not according to the invention are made and compared. In the two compositions, a cement-based composition of 80% by weight mortar cement and 20% by weight of a metakaolin (the metakaolin is varied as specified below) is combined with water with a water-to-cement ratio of 0.4. The same amount of water is added to each of the two compositions. Sand is added as aggregate in an amount so that the sand:cementitious weight ratio is 2.75 (cementitious in these examples refers to mortar cement and metakaolin). Comparative Example 4 is made with metakaolin (untreated). Example 4 is made with metakaolin that is wet milled (in a Netzsch mill for 5 minutes) and spray dried.

The flowability of the two compositions is examined in accordance with ASTM 230. Generally, the higher the flow, the lower water demand of the composites made in accordance with the present invention. Flowability can also be used as a measure of the workability of a given mixture. The results are reported in Table 5.

TABLE 5

| Example | Flow |
|---|---|
| C. Ex. 4 | 40 mm |
| Ex. 4 | 47 mm |

The compressive strength over time is examined. Each mortar composition is formed into a 2 inch cube and the compressive strength is tested. The reported compressive strengths represent the average of testing two cubes (for each composition at each testing age). When not under testing, the mortar cubes are stored in lime water. The results are reported in Table 6.

TABLE 6

| Testing Age | Compressive Strength (psi) | |
|---|---|---|
| (days) | Ex. 4 | C. Ex. 4 |
| 1 | 3,930 | 3,840 |
| 3 | 6,785 | 6,675 |
| 7 | 8,425 | 8,335 |
| 28 | 9,630 | 9,630 |

In one embodiment, the amount of water combined with the cement-based compositions and alkali-activated systems according to the present invention is about 5% less than that required to obtain the same flowability compared to conventional cement-based compositions and conventional alkali-activated systems such as those made with conventional pozzolans including untreated metakaolin (other than water, the amounts of other components, such as optional additives, are the same). In another embodiment, the amount of water combined with the cement-based compositions and alkali-activated systems according to the present invention is about 10% less than that required to obtain the same flowability compared to conventional cement-based compositions and conventional alkali-activated systems such as those made with conventional pozzolans including untreated metakaolin (other than water, the amounts of other components, such as optional additives, are the same). In yet another embodiment, the amount of water combined with the cement-based compositions and alkali-activated systems according to the present invention is about 20% less than that required to obtain the same flowability compared to conventional cement-based compositions and conventional alkali-activated systems such as those made with conventional pozzolans including untreated metakaolin (other than water, the amounts of other components, such as optional additives, are the same). This is a notable improvement since a lower water demand is typically associated with an increase in density and an increase in strength.

The mortar compositions made in accordance with the present invention not only exhibited superior workability, but also superior compressive strength. It is difficult to simultaneously improve both workability and compressive strength, yet the present invention provides cement-based compositions and alkali-activated systems exhibiting both improved workability and compressive strength.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed:

1. A method of making a highly reactive pozzolan, comprising:
   forming a slurry comprising metakaolin and a liquid;
   wet milling the slurry; and
   separating the metakaolin from the liquid to provide the highly reactive pozzolan.

2. The method of making a highly reactive pozzolan according to claim 1, wherein the liquid comprises water.

3. The method of making a highly reactive pozzolan according to claim 1, wherein the slurry comprises from about 10% to about 90% by weight of metakaolin and from about 10% to about 90% by weight of liquid.

4. The method of making a highly reactive pozzolan according to claim 1, wherein the slurry further comprises a dispersant.

5. The method of making a highly reactive pozzolan according to claim 1, wherein wet milling is conducted for a period of time from about 1 minute to about 60 minutes at a temperature from about −10° C. to about 150° C.

6. The method of making a highly reactive pozzolan according to claim 1, wherein the metakaolin is separated from the liquid by one of spray drying, flash drying, rotary drying, apron drying, or oven drying.

7. The method of making a highly reactive pozzolan according to claim 1 further comprising pulverizing the metakaolin separated from the liquid to provide the highly reactive pozzolan.

8. A method of making a cement-based composition comprising:
   providing a highly reactive pozzolan by
      forming a slurry comprising metakaolin and a liquid,
      wet milling the slurry, and
      separating the metakaolin from the liquid; and
   combining the highly reactive pozzolan with at least one cementitious material.

9. The method of making a cement-based composition according to claim 8, wherein the highly reactive pozzolan is made by
   heat treating hydrous kaolin to form metakaolin,
   forming a slurry comprising the heat treated metakaolin and water,
   wet milling the slurry, and
   separating the metakaolin from the liquid by spray drying.

10. The method of making a cement-based composition according to claim 8, wherein the highly reactive pozzolan further comprises a dispersant.

11. The method of making a cement-based composition according to claim 10, wherein the dispersant comprises at least one of an ammonia-based dispersant, a phosphate-based dispersant, a sulfonate dispersant, a carboxylic acid dispersant or a polymeric dispersant.

12. The method of making a cement-based composition according to claim 8, wherein the cement-based composition comprises from about 50% to about 99.5% of the cementitious material and from about 0.5% to about 50% of the highly reactive pozzolan.

13. The method of making a cement-based composition according to claim 10, wherein the highly reactive pozzolan comprises from about 0.1% to about 20% by weight of the dispersant.

14. The method of making a cement-based composition according to claim 8, wherein the cementitious material comprises portland cement.

15. The method of making a cement-based composition according to claim 8, wherein the separated metakaolin is pulverized prior to being combined with at least one cementitious material.

16. The method of making a cement-based composition according to claim 8, wherein the metakaolin is separated from the liquid by one of spray drying, flash drying, or oven drying.

17. A method of making a highly reactive pozzolan composition, comprising:
   forming a slurry comprising from about 20% to about 80% by weight of metakaolin and from about 20% to about 80% by weight of a liquid; and
   wet milling the slurry for a period of time from about 1 minute to about 60 minutes to provide the highly reactive pozzolan composition.

18. A cement-based composition made according to the method of claim 8.

19. A method of making an alkali-activated composition comprising:
   providing a highly reactive pozzolan by
      forming a slurry comprising metakaolin and a liquid,
      wet milling the slurry for a period of time from about 2 minutes to about 30 minutes, and
      separating the metakaolin from the liquid; and
   combining the highly reactive pozzolan with at least one geopolymeric material.

20. The method of making an alkali-activated composition according to claim 19, wherein the wet milling is conducted using a Chaser mill, Cowles mill, a Colloid mill, a Duncan mill, a Kady mill, a Morehouse mill, a Muller mill, a Netzsch mill, a Premier mill, a Kotthoff mill or a sedimentary delaminator.

21. The method of making an alkali-activated composition according to claim 19, wherein the geopolymeric material is one or more of alumino-silicate oxide, sodium hydroxide, potassium hydroxide, water, sodium silicate, potassium silicate, $Na_2O$, $K_2O$, a zeolite, silica, or alumina.

22. The method of making an alkali-activated composition according to claim 19, wherein the alkali-activated composition comprises from about 40% to about 99.5% by weight of one or more geopolymeric materials and from about 0.5% to about 60% by weight of the highly reactive pozzolan.

23. The method of making an alkali-activated composition according to claim 19, wherein the metakaolin separated from the liquid after wet milling has from about 5% to about 75% reduction in pore volume compared to the metakaolin combined with water.

* * * * *